(12) United States Patent     (10) Patent No.: US 11,846,674 B2
Lin et al.     (45) Date of Patent: Dec. 19, 2023

(54) CIRCUIT SIMULATION TEST METHOD AND APPARATUS, DEVICE, AND MEDIUM

(71) Applicant: CHANGXIN MEMORY TECHNOLOGIES, INC., Hefei (CN)

(72) Inventors: Feng Lin, Hefei (CN); Kang Zhao, Hefei (CN); Zengquan Wu, Hefei (CN)

(73) Assignee: CHANGXIN MEMORY TECHNOLOGIES, INC, Hefei (CN)

( * ) Notice: Subject to any disclaimer, the term of this patent is extended or adjusted under 35 U.S.C. 154(b) by 0 days.

(21) Appl. No.: 17/663,269

(22) Filed: May 13, 2022

(65) Prior Publication Data

US 2023/0032066 A1    Feb. 2, 2023

(30) Foreign Application Priority Data

Jul. 20, 2021 (CN) .......................... 202110821065.2

(51) Int. Cl.
    *G06F 11/22*      (2006.01)
    *G01R 31/3183*    (2006.01)
    *G01R 31/3185*    (2006.01)
    *G01R 31/319*     (2006.01)

(52) U.S. Cl.
    CPC ............. *G01R 31/318357* (2013.01); *G01R 31/31924* (2013.01); *G01R 31/318533* (2013.01)

(58) Field of Classification Search
    USPC .......................... 716/51, 52, 53, 54, 55, 136
    See application file for complete search history.

(56) References Cited

U.S. PATENT DOCUMENTS

2012/0198393 A1*   8/2012   Taoka ..................... G03F 7/705
                                                                                   716/51
2016/0099030 A1     4/2016   Ko

FOREIGN PATENT DOCUMENTS

CN        105489237 A     4/2016
CN        208954638 U     6/2019

* cited by examiner

*Primary Examiner* — Brian Ngo
(74) *Attorney, Agent, or Firm* — Cooper Legal Group, LLC (57) ABSTRACT

The present application relates to a circuit simulation test method and apparatus, a device, and a medium. The method includes: creating a parametric data model, wherein the parametric data model is configured to generate preset write data based on a preset parameter; creating a test platform, wherein the test platform is configured to generate a test result based on the preset write data; creating an eye diagram generation module, wherein the eye diagram generation module is configured to generate a data eye diagram based on the test result; and conducting a simulation test, inputting the preset write data to the test platform and obtaining the test result, and generating the data eye diagram by using the eye diagram generation module.

17 Claims, 6 Drawing Sheets

CIRCUIT SIMULATION TEST METHOD AND APPARATUS, DEVICE, AND MEDIUM

CROSS-REFERENCE TO RELATED APPLICATIONS

This application claims the priority of Chinese Patent Application No. 202110821065.2, submitted to the Chinese Intellectual Property Office on Jul. 20, 2021, the disclosure of which is incorporated herein in its entirety by reference.

TECHNICAL FIELD

The present application relates to the technical field of semiconductors and integrated circuits, and specifically, to a circuit simulation test method and apparatus, a device, and a medium.

BACKGROUND

With the rapid development of semiconductor and integrated circuit technologies, the market has increasingly high demands and performance requirements for chip products. In order to improve data transmission efficiency of a chip, data transmission bandwidth of a circuit in a device under test (DUT) of the chip is increasing. Generally, a traditional semiconductor chip test method is not suitable for testing performance of a circuit in a DUT of a memory chip.

During a write operation of a semiconductor circuit including a semiconductor memory, the semiconductor circuit can receive write data from a storage controller based on a data strobe clock signal provided by the storage controller, and then store the received write data in the semiconductor memory. Performance of the semiconductor circuit seriously affects reliability of data reception. In addition, data transmitted in the semiconductor circuit in a broadband manner is affected by each other, and intersymbol interference is caused. All these factors may cause a difference between data written into the semiconductor memory and the actually received data.

Therefore, it is necessary to provide a circuit simulation test method to efficiently test performance of a circuit in a semiconductor product, so as to improve reliability of a finished semiconductor product.

SUMMARY

An aspect of the present application provides a circuit simulation test method, including:

creating a parametric data model, wherein the parametric data model is configured to generate preset write data based on a preset parameter;

creating a test platform, wherein the test platform is configured to generate a test result based on the preset write data;

creating an eye diagram generation module, wherein the eye diagram generation module is configured to generate a data eye diagram based on the test result; and conducting a simulation test, inputting the preset write data to the test platform and obtaining the test result, and generating the data eye diagram by using the eye diagram generation module.

In the circuit simulation test method in the above embodiment, during the simulation test, the preset write data is generated by the created parametric data model based on the preset parameter; the obtained preset write data is input to the created test platform, and the test result is obtained.

Another aspect of the present application provides a circuit simulation test apparatus, including: one or more processors; and a storage apparatus, configured to store one or more programs, wherein the one or more programs, when executed by the one or more processors, cause the one or more processors to execute operations of: generating preset write data based on a preset parameter; generating a test result based on the preset write data; and generating a data eye diagram based on the test result. Yet another aspect of the present application provides a computer-readable storage medium. The computer-readable storage medium stores a computer program, and the computer program is executed by a processor to implement the steps of the method described in any one of the embodiments of the present application.

BRIEF DESCRIPTION OF THE DRAWINGS

To describe the technical solutions in the embodiments of the present application more clearly, the accompanying drawings required to describe the embodiments are briefly described below. Apparently, the accompanying drawings described below are only some embodiments of the present application. A person of ordinary skill in the art may further obtain accompanying drawings of other embodiments based on these accompanying drawings without creative efforts.

DETAILED DESCRIPTION

To facilitate the understanding of the present application, the present application is described more completely below with reference to related accompanying drawings. Preferred embodiments of the present application are shown in the accompanying drawings. However, the present application may be embodied in various forms without being limited to the embodiments described herein. On the contrary, these embodiments are provided to make the present application more thorough and comprehensive.

Unless otherwise defined, all technical and scientific terms used herein have the same meaning as commonly understood by those skilled in the technical field of the present application. The terms used in the specification of the present application are merely for the purpose of describing specific embodiments, rather than to limit the present application. The term "and/or" used herein includes any and all combinations of one or more of the associated listed items.

In the case of using "include", "have", and "contain" described in the present application, another component can be added unless explicit qualifiers such as "only" and "composed of" are used. Unless mentioned contrarily, a term in a singular form may include a plural form and cannot be understood as one.

It should be understood that the terms such as "first" and "second" used herein may be used to describe various elements, but these elements are not limited by these terms. Instead, these terms are merely intended to distinguish one element from another. For example, without departing from the scope of the present application, a first element may be referred to as a second element, and similarly, the second element may be referred to as the first element.

In the description of the present application, it should be noted that, unless otherwise clearly specified, the terms such as "mounting", "interconnection", "connection" should be comprehended in a broad sense. For example, the "connection" may be a fixed connection, a detachable connection, or an integral connection; or may be a direct connection, an indirect connection via a medium, or internal communication within two elements. A person of ordinary skill in the art may understand specific meanings of the foregoing terms in the present application based on a specific situation.

Figure 1:
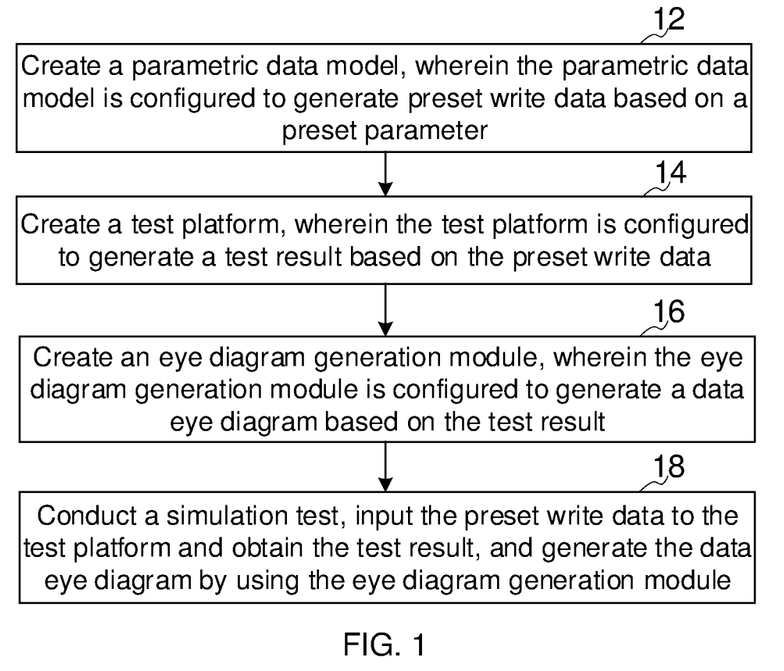
FIG. 1 is a schematic flowchart of a circuit simulation test method according to an embodiment of the present application.

Referring to FIG. 1, in an embodiment of the present application, a circuit simulation test method is provided, including the following steps:

Step 12: Create a parametric data model, wherein the parametric data model is configured to generate preset write data based on a preset parameter.

Step 14: Create a test platform, wherein the test platform is configured to generate a test result based on the preset write data.

Step 16: Create an eye diagram generation module, wherein the eye diagram generation module is configured to generate a data eye diagram based on the test result.

Step 18: Conduct a simulation test, input the preset write data to the test platform and obtain the test result, and generate the data eye diagram by using the eye diagram generation module.

Figure 2:
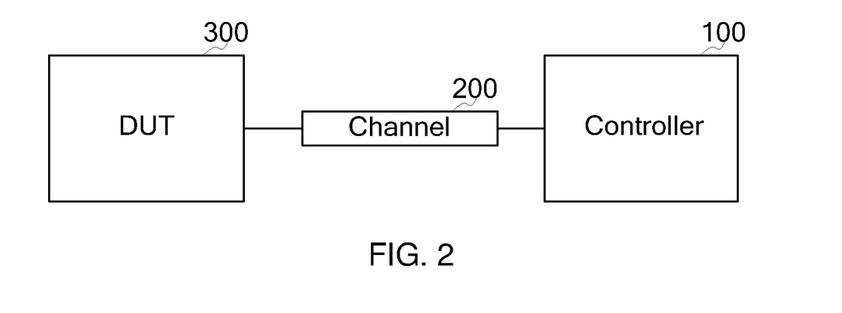
FIG. 2 schematically illustrates an application scenario of a circuit simulation test method according to an embodiment of the present application.
Figure 3:
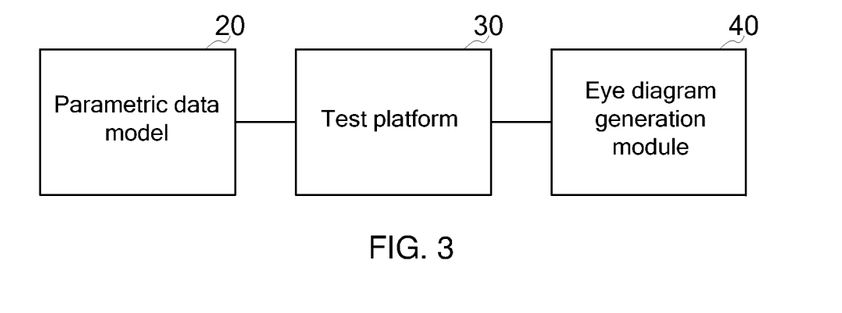
FIG. 3 is a structural block diagram of a circuit simulation test apparatus according to an embodiment of the present application.

Specifically, referring to FIG. 2 and FIG. 3, during a write operation of a DUT including a semiconductor circuit, the DUT 300 can receive a data signal DQ from a controller 100 based on a data strobe clock signal (DQS or WCK) provided by the controller 100 by using a channel 200. Then the DUT stores the received data signal into a semiconductor memory of the DUT. As shown in FIG. 2, when being transmitted by using the channel 200, the signal sent by the controller 100 is inevitably affected by channel attenuation, intersymbol interference, or other factors, resulting in a difference between data received by the semiconductor memory and the data actually sent by the controller 100. A traditional test method cannot well test influence of the channel attenuation, the intersymbol interference, and other factors on the DUT 300. In one embodiment of the present application, as shown in FIG. 3, the parametric data model 20 is set to be connected to the eye diagram generation module 40 by using the test platform 30. A more real input signal can be simulated by designing the parametric data model, so as to perform testing to accurately obtain a degree to which performance and transmitted data of a circuit in a semiconductor product are affected by the intersymbol interference and other factors. In some embodiments, the test platform 30 may be a high-speed interface (I/O) circuit, and in other embodiments, the test platform 30 may be a high-speed receiver circuit. During the simulation test, the preset write data is generated by the created parametric data model 20 based on the preset parameter; the obtained preset write data is input to the created test platform 30, and the test result is obtained; and the data eye diagram is generated by using the eye diagram generation module 40. Under a same simulation test environment and condition, a data eye diagram generated based on write data without the intersymbol interference in an ideal state can be compared with the data eye diagram generated based on the preset write data generated by the created parametric data model 20 based on the preset parameter, to test the degree to which the performance and the transmitted data of the circuit in the semiconductor product are affected by the intersymbol interference and other factors, so as to perform testing to quickly obtain a semiconductor product whose circuit performance meets a preset standard, and improve a yield and reliability of factory-built semiconductor products. The present application effectively conducts the simulation test to obtain that the data transmitted by the circuit in the semiconductor product is affected by the intersymbol interference and other factors, which provides data support for studying and obtaining a formation mechanism and a suppression method of the intersymbol interference of the transmitted data.

As an example, the high-speed interface (I/O) circuit may be a circuit in a high-speed semiconductor memory. In some embodiments, the high-speed interface (I/O) circuit may be a circuit in a mobile semiconductor memory. This is not limited in the present application. In this embodiment of the present application, the semiconductor memory can be any kind of semiconductor memory, for example, a double data rate synchronous dynamic random access memory (DDR SDRAM). When different types and models of semiconductor memories are used, mark symbols used by a data strobe clock signal may be different, which is not limited in the present application.

Figure 4:
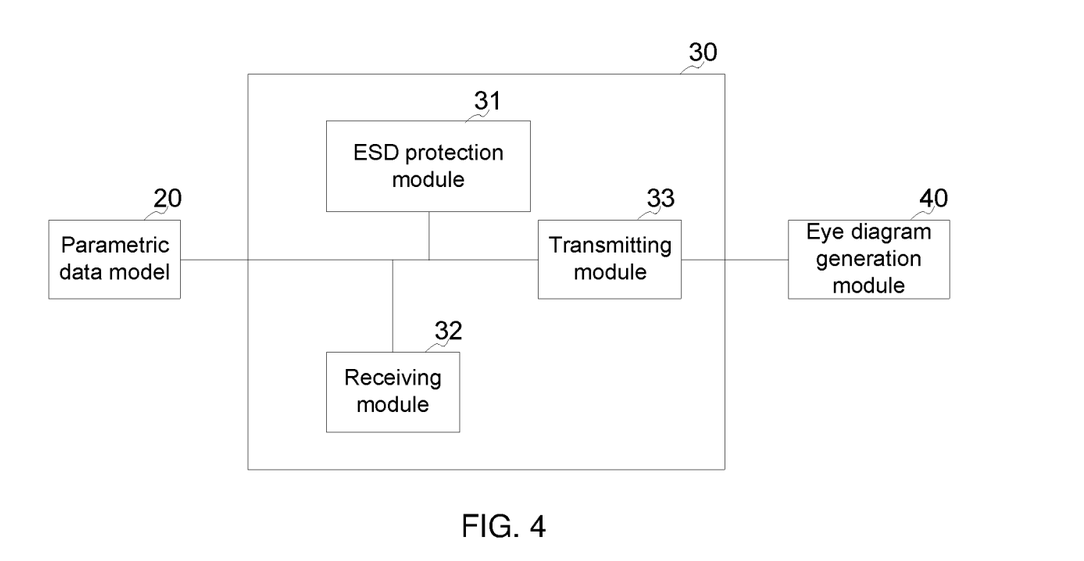
FIG. 4 is a structural block diagram of a circuit simulation test apparatus according to another embodiment of the present application.

As an example, referring to FIG. 4, in an embodiment of the present application, the test platform 30 includes an ESD protection module 31, a receiving module 32, and a transmitting module 33. Under the same simulation test environment and condition, a first data eye diagram is generated by the eye diagram generation module 40 based on the write data without the intersymbol interference in the ideal state, and a second data eye diagram is generated by the eye diagram generation module 40 based on the preset write data generated by the created parametric data model 20 based on the preset parameter. Then, the eye diagram generation module 40 generates a composite eye diagram based on the first data eye diagram and the second data eye diagram. In this way, the degree to which the performance and the transmitted data of the circuit in the semiconductor product are affected by the intersymbol interference and other factors is determined based on the composite eye diagram, so as to perform testing to quickly obtain the semiconductor product whose circuit performance meets the preset standard, and improve the yield and reliability of the factory-built semiconductor products. The present application effectively conducts the simulation test to obtain that the data transmitted by the circuit in the semiconductor product is affected by the intersymbol interference and other factors, which provides the data support for studying and obtaining the formation mechanism and the suppression method of the intersymbol interference of the transmitted data.

Figure 5:
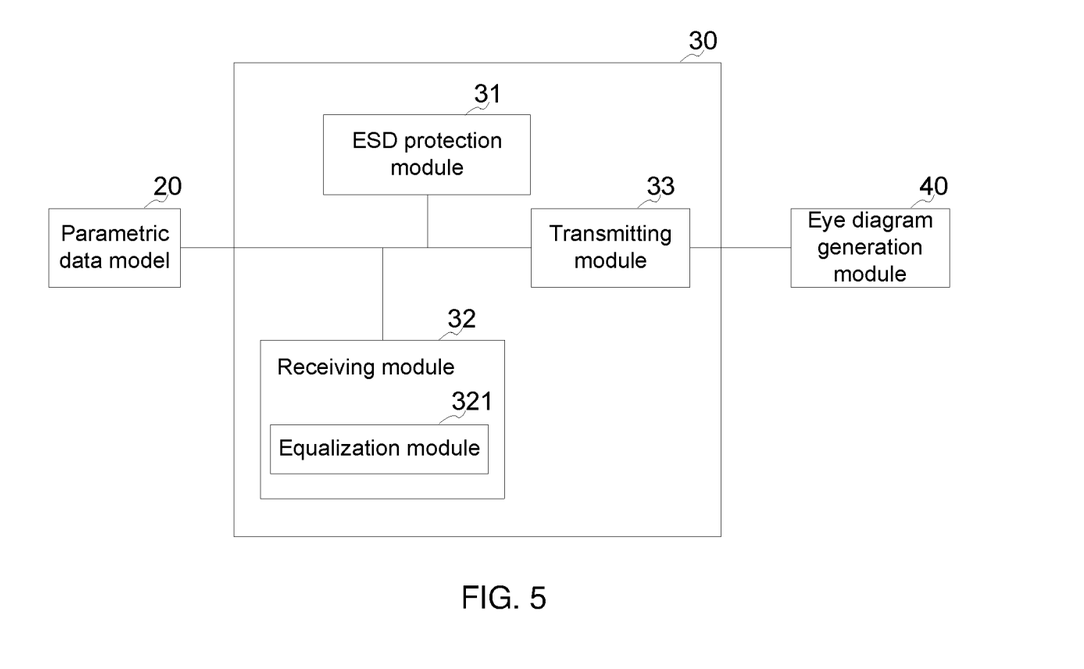
FIG. 5 is a structural block diagram of a circuit simulation test apparatus according to still another embodiment of the present application.

As an example, referring to FIG. 5, in an embodiment of the present application, the receiving module 32 may be set to further include an equalization module 321. The receiving module 32 may be set to receive the write data without the intersymbol interference in the ideal state when the equalization module 321 is in a first state, such that the eye diagram generation module 40 generates the first data eye diagram based on the write data without the intersymbol interference in the ideal state; and the receiving module 32 may be set to receive the preset write data when the equalization module 321 is in a second state, wherein the preset write data is generated by the parametric data model 20 based on the preset parameter. Then, the eye diagram generation module 40 generates the composite eye diagram based on the first data eye diagram and the second data eye diagram, so as to determine, based on the composite eye diagram, the degree to which the performance and the transmitted data of the circuit in the semiconductor product are affected by the intersymbol interference and other factors, so as to perform testing to quickly obtain the semiconductor product whose circuit performance meets the preset standard, and improve the yield and the reliability of the factory-built semiconductor products.

Figure 6:
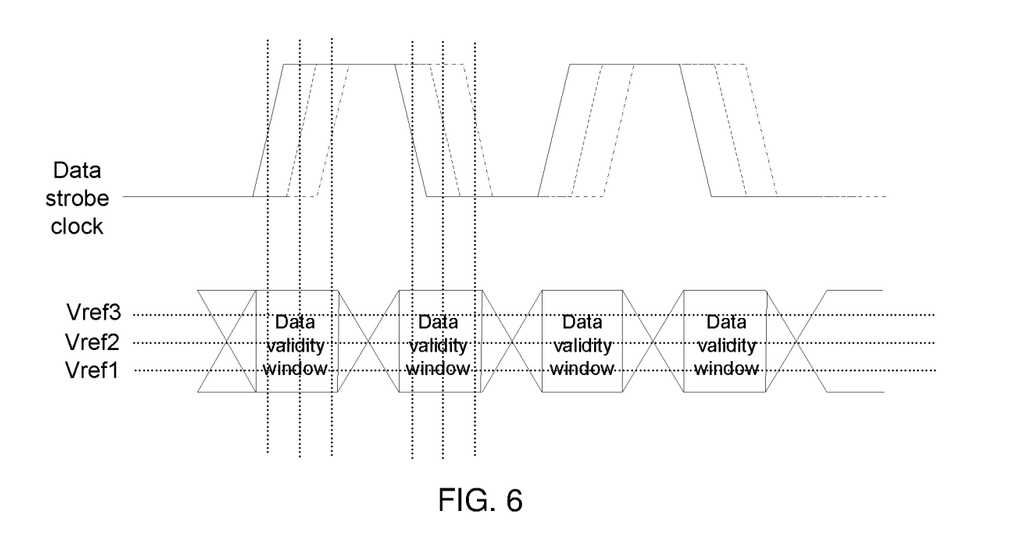
FIG. 6 schematically illustrates a data strobe clock signal and a data validity window under different reference voltages according to an embodiment of the present application.

Specifically, FIG. 6 schematically illustrates a data strobe clock signal and a data validity window under different reference voltages according to an embodiment of the present application. Three reference voltages Vref1, Vref2, and Vref3 are used as an example for description. It is assumed that rising and falling edges of the data strobe clock signal deviate from the middle of the data validity window under the reference voltages Vref1 and vref3, but are just in the middle of the data validity window under the reference voltage Vref2. In this case, Vref2 can be used as a target reference voltage. In an exemplary embodiment, a target strobed data time and/or the target reference voltage can be determined based on the data eye diagram. The data strobe clock signal may include a data strobe clock_t signal and a data strobe clock_c signal. Both are inverted signals. An LPDDR4 is used as an example. A receiving module corresponding to each data signal DQ is usually next to a DQ input port, and the data strobe clock signal DQS needs to be pulled from an input port of the data strobe clock signal DQS to the receiving module corresponding to each data signal DQ. Therefore, during a write operation, an internal delay of the data strobe clock signal DQS is greater than that of the data signal DQ in a receiving direction. This path mismatching may affect accurate triggering of the write operation.

In order to improve this situation, the semiconductor memory requires a storage controller to compensate for a delay difference between the data strobe clock signal DQS and the data signal DQ. The data strobe clock signal DQS is sent earlier than the data signal DQ, so as to ensure that they can receive data accurately. Advance sending time is defined in the JEDEC standard, which is referred to as a strobed data time tDQS2DQ. The data strobe clock signal DQS of the LPDDR4 is used as an example for description. The data strobe clock signal may include the inverted DQS_t and DQS_c. In a training stage, correct timing of the strobed data time tDQS2DQ is ensured through the write operation. Each strobed data time tDQS2DQ is determined first. The data strobe clock signal DQS is first input to the LPDDR4, and then input, through a clock path, to the receiving module corresponding to each DQ as a clock triggering signal of each receiving module. After the time tDQS2DQ, a corresponding data signal DQ is input to each receiving module. After that, data is obtained and read from a storage unit that is of the LPDDR4 and corresponds to each receiving module, and whether each piece of data written into a corresponding receiving module is consistent with data read from the corresponding receiving module. If they are consistent, the test result of the corresponding DUT is test passed; or if they are inconsistent, the test result of the corresponding DUT is test failed.

As shown in FIG. 6, the data signal is usually not perfectly square, but wave-shaped. Therefore, it is recommended that rising and falling edges of a data strobe clock signal used to trigger sampling, for example, the DQS, can be located in the middle of a data validity window of a high-speed data signal, so as to well capture the high-speed data signal.

Figure 7:
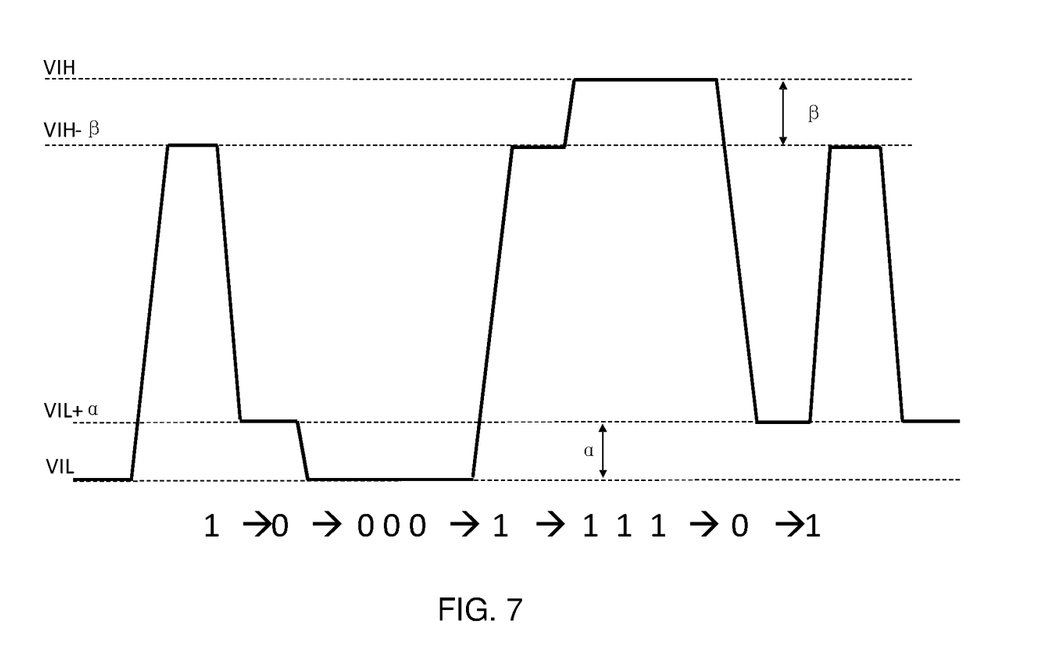
FIG. 7 schematically illustrates a waveform of preset write data according to an embodiment of the present application.

As an example, referring to FIG. 7, in an embodiment of the present application, the preset write data is a serial multi-bit data string. An input signal more approximate to a real situation is generated based on the parametric data model 20 to fit a real input signal by using a parameter. Compared with a traditional test method that cannot test the influence of the channel attenuation, the intersymbol interference, and other factors on the DUT 300, this embodiment can more really simulate circuit performance of a receiver. In this way, during the simulation test, the data eye diagram is generated based on the preset write data, so as to obtain that the data transmitted by the circuit in the semiconductor product is affected by the intersymbol interference and other factors.

As an example, referring to FIG. 7, in an embodiment of the present application, the preset parameter includes a first value $\beta$ and a second value $\alpha$; and the preset write data is configured as follows: if previous-bit data is at a low level, for example, VIL, a voltage VIH–$\beta$ of next-bit high-level data is lower than a preset high voltage VIH by the first value $\beta$; and if the previous-bit data is at a high level, for example, VIH–$\beta$, a voltage VIL+$\alpha$ of next-bit low-level data is higher than a preset low voltage VIL by the second value $\alpha$.

As an example, referring to FIG. 7, in an embodiment of the present application, the preset write data is further configured as follows: if the previous-bit data is at the low level, the voltage of the next-bit low-level data is equal to the preset low voltage VIL; and if migrated-bit data is at the high level, the voltage of the next-bit high-level data is equal to the preset high voltage VIH.

Figure 8:
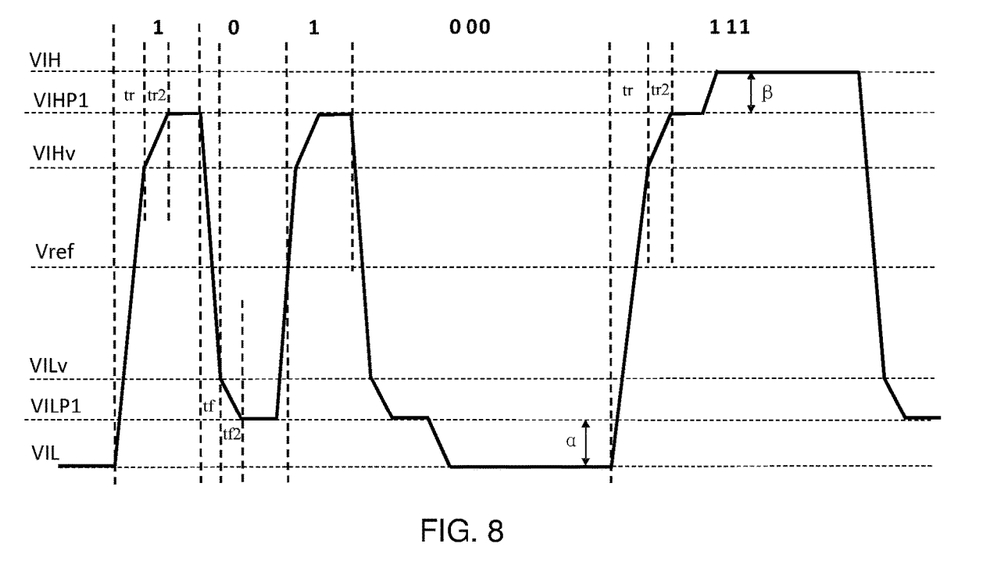
FIG. 8 schematically illustrates a waveform of preset write data according to another embodiment of the present application.

As an example, referring to FIG. 8, in an embodiment of the present application, the preset parameter includes a first rising delay tr, a second rising delay tr2, and a third value VIH–VIHv; and the preset write data is further configured as follows: if the previous-bit data is at the low level, for example, the VIL, time required for increasing the voltage of the next-bit high-level data from a low level state to be lower than the preset high voltage VIH by the third value VIH–VIHv is the first rising delay tr, and time required for increasing the voltage of the next-bit high-level data that is lower than the preset high voltage VIH by the third value VIH–VIHv to be lower than the preset high voltage VIH by the first value $\beta$ is the second rising delay tr2, wherein the third value VIH–VIHv is greater than the first value $\beta$, and $\beta$=VIH–VIHP1. This embodiment uses the parameter to more accurately fit the real input signal, and generates, based on the parametric data model 20, an input signal more accurately approximate to the real situation. Compared with the traditional test method that cannot test the influence of the channel attenuation, the intersymbol interference, and other factors on the DUT 300, this embodiment can more really simulate the circuit performance of the receiver.

As an example, referring to FIG. 8, in an embodiment of the present application, the preset parameter further include a first falling delay tf, a second falling delay tf2, and a fourth value VILv−VIL; and the preset write data is further configured as follows: if the previous-bit data is at the high level, time for reducing the voltage of the next-bit low-level data from a high level state to be higher than the preset low voltage VIL by the fourth value VILv−VIL is the first falling delay tf, and time for reducing the voltage of the next-bit low-level data that is higher than the preset low voltage VIL by the fourth value VILv−VIL to be higher than the preset low voltage VIL by the second value α is the second falling delay tf2, wherein the fourth value VILv−VIL is greater than the second value α, and α=VILP1−VIL.

As an example, in an embodiment of the present application, the generating a test result based on the preset write data includes:

receiving, by the test platform, the preset write data, and obtaining a reception result; and comparing the preset write data and the reception result bit by bit, wherein if the preset write data and the reception result are the same, the test result is test passed; otherwise, the test result is test failed.

Specifically, the DUT receives the preset write data in response to the data strobe clock signal, compares a voltage of the preset write data and a reference voltage, and obtains the reception result. The test platform receives the preset write data and obtains the reception result, and compares the preset write data and the reception result bit by bit. If the preset write data is equal to the reception result, a first test result of the DUT under a first strobed data time and a first reference voltage is test passed; or if the write data is not equal to the read data, a first test result of the DUT under a first strobed data time and a first reference voltage is test failed.

As an example, in an embodiment of the present application, the inputting the preset write data to the test platform and obtaining the test result further includes the following steps:

Step 182: Scan a reference voltage range to obtain each reference voltage.

Step 184: Scan a sampling point for sampling the preset write data by the data strobe clock signal.

Step 186: Input the preset write data to the test platform, and obtain a test result under each reference voltage and each sampling point.

Specifically, in this embodiment of the present application, in order to generate the data eye diagram, the reference voltage range of the circuit in the DUT is scanned to obtain a plurality of reference voltages Vref. The sampling point for sampling the preset write data is scanned by the data strobe clock signal (for example, the DQS or the WCK).

In the following example, if the semiconductor memory is a DDR4 or the LPDDR4 (Low Power DDRSDRAM), the data strobe clock signal can be expressed as the DQS, the strobed data time in the following description can be correspondingly expressed as tDQS2DQ, and a time difference between the data strobe clock signal DQS of the DDR4 or LPDDR4 and the data signal DQ is tDQS2DQ; if the semiconductor memory is a DDR5/LPDDR5, the data strobe clock signal can be expressed as the WCK, and the strobed data time in the following description can be correspondingly expressed as tWCK2DQI, and a time difference between the data strobe clock signal WCK of DDR5 or LPDDR5 and the data signal DQ is tWCK2DQI. The test result of the circuit in the DUT under each reference voltage and each sampling point is obtained.

As an example, in an embodiment of the present application, the generating the data eye diagram by using the eye diagram generation module includes: taking each strobed data time as a first coordinate value and each reference voltage as a second coordinate value, and generating, based on each strobed data time and the test result under each reference voltage, a two-dimensional data eye diagram displaying the test result.

Specifically, for example, the obtained test result of the DUT under each reference voltage and each sampling point is test passed (represented by ●) or test failed (which may be represented by ○). The data eye diagram can be generated based on the test result obtained in the above step and a reference voltage and a sampling point that correspond to the test result.

Figure 9:
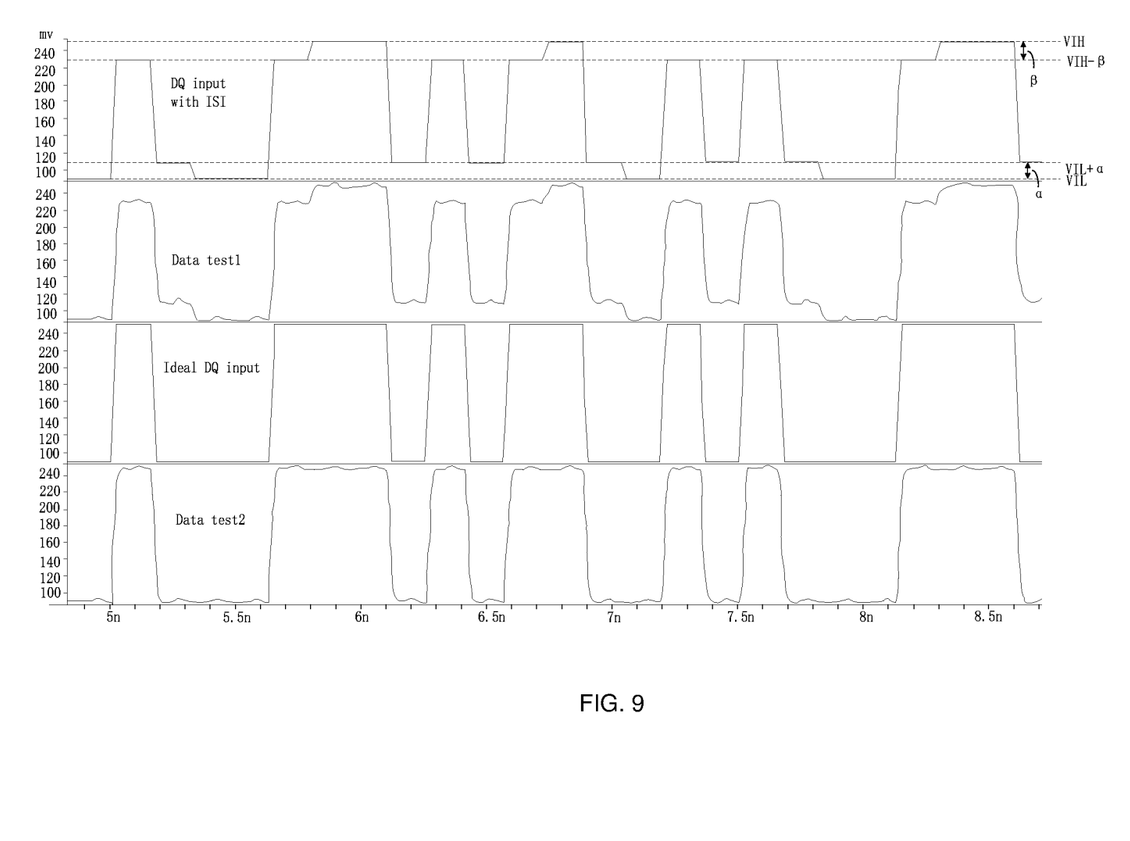
FIG. 9 schematically illustrates waveforms of preset write data and a corresponding test result according to an embodiment of the present application.
Figure 10:
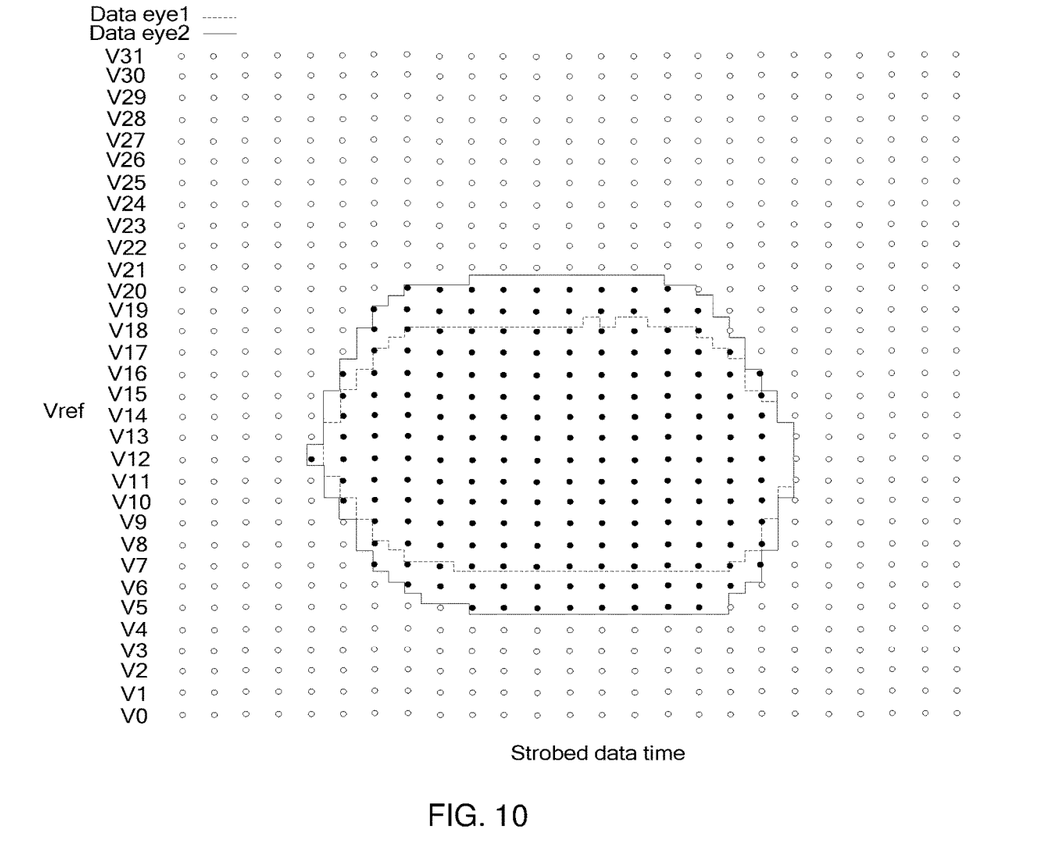
FIG. 10 schematically illustrates a composite eye diagram obtained based on data in FIG. 9 according to the present application.

As an example, referring to FIG. 9, a first preset parameter "DQ input with ISI" affected by the intersymbol interference is obtained according to a configuration rule of the preset parameter in the embodiment shown in FIG. 7. A first test result "Data test1" is obtained by inputting the first preset parameter "DQ input with ISI" to the test platform, and a second preset parameter "Ideal DQ input" that is not affected by the intersymbol interference and other factors in the ideal state is input to the test platform to obtain a second test result "data test2". The first preset parameter "DQ input with ISI" is compared with the first test result "Data test1" bit by bit to obtain a first comparison result, and data eye 1 (Data eye1) shown in FIG. 10 is generated based on the first comparison result; and the second preset parameter "DQ input with ISI" is compared with the second test result "data test2" bit by bit to obtain a second comparison result, and data eye 2 (Data eye2) shown in FIG. 10 is generated based on the second comparison result. In FIG. 10, ● indicates that the test result is test passed and ○ indicates that the test result is test failed. By comparing Data eye1 and Data eye2 in FIG. 10, it can be clearly found that an "eye opening amplitude" of Data eye1 obtained based on the first preset parameter "DQ input with ISI" considering the influence of the intersymbol interference is obviously smaller than an "eye opening amplitude" of Data eye2 obtained based on the second preset parameter "Ideal DQ input" not affected by the intersymbol interference. The data eye diagram can be obtained by conducting the simulation test on the DUT according to the method described in this embodiment of the present application, and the performance of the circuit in the DUT can be determined based on a size of an "eye opening amplitude" of the data eye diagram. In this embodiment, the "eye opening amplitude" can be expressed as area covered by passing schematic points in the two-dimensional data eye diagram. The present application can also perform testing to quickly obtain the semiconductor product whose circuit performance meets the preset standard, and improve the yield and the reliability of the factory-built semiconductor products. The present application effectively conducts the simulation test to obtain that the data transmitted by the circuit in the semiconductor product is affected by the intersymbol interference and other factors, which provides the data support for studying and obtaining the formation mechanism and the suppression method of the intersymbol interference of the transmitted data.

In addition, a most suitable target strobed data time and/or target reference voltage of the circuit in the DUT can also be found quickly and accurately based on the generated data eye diagram, which is helpful to ensure accuracy of a write data signal when the circuit in the DUT receives the data signal based on the data strobe clock signal. The method provided in this embodiment of the present application can be used to perform simulation to generate pre-layout and post-layout data eye diagrams that have same accuracy.

As an example, in an embodiment of the present application, the scanning a sampling point for sampling the preset write data by the data strobe clock signal includes: scanning a strobed data time range based on a first step to obtain each strobed data time.

The LPDDR4 is used as an example. The strobed data time is tDQS2DQ, and a tDQS2DQ range [T1, T2] may be [0 ps, 800 ps]. The LPDDR5 is used as an example. The strobed data time is tWCK2DQI, and a tWCK2DQI range [T1, T2] may be [0 ps, 700 ps].

In an exemplary embodiment, the first step may include a first substep and a second substep. The first substep may be greater than the second substep.

In an embodiment of the present application, the strobed data time range of the circuit in the DUT is scanned based on the first step to obtain each strobed data time, which may include: determining an edge strobed data time range on at least one side of the strobed data time range; setting the first substep of the edge strobed data time range; obtaining an intermediate strobed data time range, excluding the edge strobed data time range, in the strobed data time range; obtaining the second substep of the intermediate strobed data time range; and scanning the edge strobed data time range based on the first substep, and scanning the intermediate strobed data time range based on the second substep, to obtain each strobed data time.

In an embodiment of the present application, if each strobed data time is taken as a horizontal coordinate (the first coordinate value), a strobed data time range on a left side, a right side, or each side of the strobed data time range can be taken as the edge strobed data time range. The edge strobed data time range is scanned based on the larger first substep to obtain each strobed data time in the edge strobed data time range, and the intermediate strobed data time range other than the above edge strobed data time range is scanned based on the smaller second substep to obtain each strobed data time in the intermediate strobed data time range.

In an embodiment of the present application, if each strobed data time is taken as a vertical coordinate (the first coordinate value), a strobed data time range on an upper side, a lower side, and each side of the strobed data time range can be taken as the edge strobed data time range. The edge strobed data time range is scanned based on the larger first substep to obtain each strobed data time in the edge strobed data time range, and the intermediate strobed data time range other than the above edge strobed data time range is scanned based on the smaller second substep to obtain each strobed data time in the intermediate strobed data time range.

In an embodiment of the present application, on one hand, scanning performed based on the larger first substep to obtain each strobed data time in the edge strobed data time range can reduce a total quantity of finally obtained strobed data times, so as to reduce occupied storage space, reduce an amount of calculation, and improve a speed of obtaining the target strobed data time subsequently. On the other hand, because a target strobed data time to be obtained based on the data eye diagram subsequently is usually located in the middle of the strobed data time range, scanning performed based on the smaller second substep to obtain each strobed data time in the intermediate strobed data time range can improve accuracy of the obtained target strobed data time.

It should be noted that, although scanning performed based on the unequal first and second substeps to obtain each strobed data time is used as an example for description below, the present application is not limited to this. In other embodiments, the entire strobed data time range can alternatively be scanned based on equal steps to obtain each strobed data time.

In an embodiment of the present application, the scanning a reference voltage range to obtain each reference voltage includes: scanning the reference voltage range based on a second step to obtain each reference voltage.

As an example, the second step may be set to include a third substep and a fourth substep, and the third substep is greater than the fourth substep.

In an embodiment of the present application, the reference voltage range of the circuit in the DUT is scanned based on the second step to obtain each reference voltage, which may include: determining an edge reference voltage range on at least one side of the reference voltage range; obtaining the third substep of the edge reference voltage range; determining an intermediate reference voltage range, excluding the edge reference voltage range, in the reference voltage range; obtaining the fourth substep of the intermediate reference voltage range; and scanning the edge reference voltage range based on the third substep, and scanning the intermediate reference voltage range based on the fourth substep, to obtain each reference voltage.

For example, if each reference voltage Vref is taken as a vertical coordinate (the second coordinate value), a reference voltage range on an upper side, a lower side, and each side of the reference voltage range can be taken as the edge reference voltage range. The edge reference voltage range is scanned based on the larger third substep to obtain each reference voltage in the edge reference voltage range, and the intermediate reference voltage range other than the above edge reference voltage range is scanned based on the smaller fourth substep to obtain each reference voltage in the intermediate reference voltage range.

In an embodiment of the present application, if each reference voltage Vref is taken as a horizontal coordinate (the second coordinate value), a reference voltage range on a left side, a right side, or each side of the reference voltage range can be taken as the edge reference voltage range. The edge reference voltage range is scanned based on the larger third substep to obtain each reference voltage in the edge reference voltage range, and the intermediate reference voltage range other than the above edge reference voltage range is scanned based on the smaller fourth substep to obtain each reference voltage in the intermediate reference voltage range.

In an embodiment of the present application, on one hand, scanning performed based on the larger third substep to obtain each reference voltage in the edge reference voltage range can reduce a total quantity of finally obtained reference voltages, so as to reduce occupied storage space, reduce an amount of calculation, and improve a speed of obtaining the target reference voltage subsequently. On the other hand, because a target reference voltage to be obtained based on the data eye diagram subsequently is usually located in the middle of the reference voltage range, scanning performed based on the smaller fourth substep to obtain each reference voltage in the intermediate reference voltage range can improve accuracy of the obtained target reference voltage.

It should be noted that, although scanning performed based on the unequal third and fourth substeps to obtain each reference voltage is used as an example for description below, the present application is not limited to this. In other embodiments, the entire reference voltage range can alternatively be scanned based on equal steps to obtain each reference voltage.

The circuit in the DUT has a corresponding reference voltage range (Range). For example, as stipulated in the Joint Electron Device Engineering Council (JEDEC) standard, a reference voltage Vref of the LPDDR4 is in two ranges: VDDQ with Range[0] being 10.0% to 30.0%, and VDDQ with range [1] being 22.0% to 42.0%, and steps of the two ranges each are 0.4%. The two voltage reference ranges overlap, as shown in Table 1 below.

TABLE 1

| Function | Operand | Range[0]Values (% of VDDQ) | | Range[1]Values (% of VDDQ) | |
|---|---|---|---|---|---|
| Setting Vref by using a register | OP[5:0] | 000000B: 10.0% | 011010B: 20.4% | 000000B: 22.0% | 011010B: 32.4% |
| | | 000001B: 10.4% | 011011B: 20.8% | 000001B: 22.4% | 011011B: 32.8% |
| | | 000010B: 10.8% | 011100B: 21.2% | 000010B: 22.8% | 011100B: 33.2% |
| | | 000011B: 11.2% | 011101B: 21.6% | 000011B: 23.2% | 011101B: 33.6% |
| | | 000100B: 11.6% | 011110B: 22.0% | 000100B: 23.6% | 011110B: 34.0% |
| | | 000101B: 12.0% | 011111B: 22.4% | 000101B: 24.0% | 011111B: 34.4% |
| | | 000110B: 12.4% | 100000B: 22.8% | 000110B: 24.4% | 100000B: 34.8% |
| | | 000111B: 12.8% | 100001B: 23.2% | 000111B: 24.8% | 100001B: 35.2% |
| | | 001000B: 13.2% | 100010B: 23.6% | 001000B: 25.2% | 100010B: 35.6% |
| | | 001001B: 13.6% | 100011B: 24.0% | 001001B: 25.6% | 100011B: 36.0% |
| | | 001010B: 14.0% | 100100B: 24.4% | 001010B: 26.0% | 100100B: 36.4% |
| | | 001011B: 14.4% | 100101B: 24.8% | 001011B: 26.4% | 100101B: 36.8% |
| | | 001100B: 14.8% | 100110B: 25.2% | 001100B: 26.8% | 100110B: 37.2% |
| | | 001101B: 15.2% | 100111B: 25.6% | 001101B: 27.2% (default) | 100111B: 37.6% |
| | | 001110B: 15.6% | 101000B: 26.0% | 001110B: 27.6% | 101000B: 38.0% |
| | | 001111B: 16.0% | 101001B: 26.4% | 001111B: 28.0% | 101001B: 38.4% |
| | | 010000B: 16.4% | 101010B: 26.8% | 010000B: 28.4% | 101010B: 38.8% |
| | | 010001B: 16.8% | 101011B: 27.2% | 010001B: 28.8% | 101011B: 39.2% |
| | | 010010B: 17.2% | 101100B: 27.6% | 010010B: 29.2% | 101100B: 39.6% |
| | | 010011B: 17.6% | 101101B: 28.0% | 010011B: 29.6% | 101101B: 40.0% |
| | | 010100B: 18.0% | 101110B: 28.4% | 010100B: 30.0% | 101110B: 40.4% |
| | | 010101B: 18.4% | 101111B: 28.8% | 010101B: 30.4% | 101111B: 40.8% |
| | | 010110B: 18.8% | 110000B: 29.2% | 010110B: 30.8% | 110000B: 41.2% |
| | | 010111B: 19.2% | 110001B: 29.6% | 010111B: 31.2% | 110001B: 41.6% |
| | | 011000B: 19.6% | 110010B: 30.0% | 011000B: 31.6% | 110010B: 42.0% |
| | | 011001B: 20.0% | Others: reserved | 011001B: 32.0% | Others: reserved |

In the following example, the reference voltage range is the above Range[0] and Range[1]. However, it should be noted that different protocols have different reference voltage ranges and steps. Therefore, the embodiments of the present application are not limited to the above examples.

The present application further provides a circuit simulation test apparatus. Referring to FIG. 3, the circuit simulation test apparatus includes a parametric data model 20, a test platform 30, and an eye diagram generation module 40, wherein the parametric data model 20 is configured to generate preset write data based on a preset parameter; the test platform 30 is configured to generate a test result based on the preset write data; and the eye diagram generation module 40 is configured to generate a data eye diagram based on the test result. Under a same simulation test environment and condition, the present application can compare a data eye diagram generated based on write data without intersymbol interference in an ideal state and the data eye diagram generated based on the preset write data generated by the created parametric data model based on the preset parameter, to test a degree to which performance and transmitted data of a circuit in a semiconductor product are affected by the intersymbol interference and other factors, so as to perform testing to quickly obtain a semiconductor product whose circuit performance meets a preset standard, and improve a yield and reliability of factory-built semiconductor products. The present application effectively conducts a simulation test to obtain that the data transmitted by the circuit in the semiconductor product is affected by the intersymbol interference and other factors, which provides data support for studying and obtaining a formation mechanism and a suppression method of the intersymbol interference of the transmitted data.

In an embodiment of the present application, an electronic device is provided, including a memory and a processor, wherein the memory stores a computer program executable on the processor, and the program is executed by the processor to implement the steps of the method described in any embodiment of the present application.

In an embodiment of the present application, a computer-readable storage medium is provided, wherein the computer-readable storage medium stores a computer program, and the computer program is executed by a processor to implement the steps of the method described in any embodiment of the present application.

In the electronic device or computer-readable storage medium in the above embodiments, during a simulation test, preset write data is generated by a created parametric data model based on a preset parameter; the obtained preset write data is input to a created test platform, and a test result is obtained; and a data eye diagram is generated by using an eye diagram generation module. Under a same simulation test environment and condition, a data eye diagram generated based on write data without intersymbol interference in an ideal state can be compared with the data eye diagram generated based on the preset write data generated by the created parametric data model based on the preset parameter, to test a degree to which performance and transmitted data of a circuit in a semiconductor product are affected by the intersymbol interference and other factors, so as to perform testing to quickly obtain a semiconductor product whose circuit performance meets a preset standard, and improve a yield and reliability of factory-built semiconductor products. The present application effectively conducts a simulation test to obtain that the data transmitted by the circuit in the semiconductor product is affected by the intersymbol interference and other factors, which provides data support for studying and obtaining a formation mechanism and a suppression method of the intersymbol interference of the transmitted data.

It should be understood that although the steps in the flowchart of FIG. 1 are shown in turn as indicated by an arrow, these steps are not necessarily performed in turn as indicated by the arrow. Unless clearly described otherwise, the execution order of the steps is not strictly limited, and the steps may be executed in other orders. Moreover, at least some of the steps in FIG. 1 may include a plurality of substeps or stages. The substeps or stages are not necessarily executed at the same time, but may be executed at different times. The execution order of the substeps or stages is not necessarily carried out sequentially, but may be executed alternately with other steps or at least some of the substeps or stages of other steps.

Those of ordinary skill in the art can understand that all or part of the processes of realizing the method in the above embodiments can be completed by a computer program instructing relevant hardware. The computer program may be stored in a non-volatile computer-readable storage medium. When the computer program is executed, the processes of the method embodiments are performed. Any reference to a memory, a storage, a database, or other media used in the embodiments of the present application may include a non-volatile and/or volatile memory.

Figure 11:
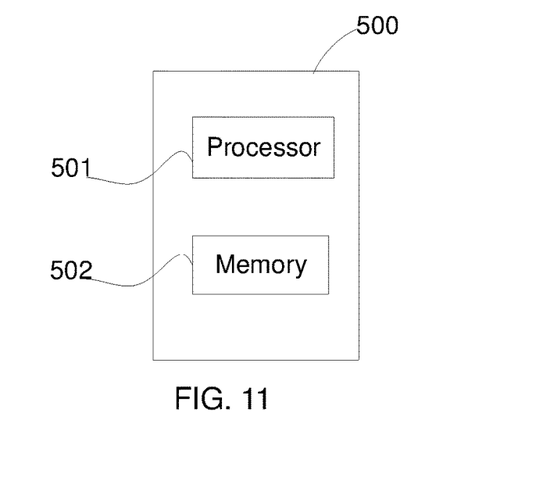
FIG. 11 is a schematic diagram of modules of an electronic equipment according to an embodiment of the present application.

An exemplary embodiment of the present disclosure provides a circuit simulation test apparatus. Referring to FIG. 11, the circuit simulation test apparatus 500 may be provided as a terminal device. The circuit simulation test apparatus 500 may include a processor 501, and one or more processors may be set as required. The circuit simulation test apparatus 500 may further include a memory 502 configured to store an executable instruction, such as an application program, of the processor 501. One or more memories may be set as required. The memory may store one or more application programs. The processor 501 is configured to execute the instruction to perform the foregoing method.

Persons skilled in the art should understand that the embodiments of the present disclosure may be provided as a method, an apparatus (device), or a computer program product. Therefore, the present disclosure may use a form of hardware only examples, software only examples, or examples with a combination of software and hardware. Moreover, the present disclosure may be in a form of a computer program product that is implemented on one or more computer-usable storage media that include computer-usable program code. The computer storage media include volatile and non-volatile, removable and non-removable media implemented in any method or technology for storing information (such as computer-readable instructions, data structures, program modules, or other data), including but not limited to, a RAM, a ROM, an EEPROM, a flash memory or other storage technologies, a CD-ROM, a digital versatile disk (DVD) or other optical disc storage, a magnetic cassette, a magnetic tape, magnetic disk storage or other magnetic storage apparatuses, or any other medium that can be used to store desired information and can be accessed by a computer. In addition, as is well known to persons of ordinary skill in the art, the communication media usually contain computer-readable instructions, data structures, program modules, or other data in modulated data signals such as carrier waves or other transmission mechanisms, and may include any information transfer medium.

In an exemplary embodiment, a non-transitory computer-readable storage medium including instructions is provided. Referring to FIG. 11, for example, the non-transitory computer-readable storage medium may be the memory 502 including instructions. The foregoing instructions may be executed by the processor 501 of circuit simulation test apparatus 500 to complete the foregoing method. For example, the non-transitory computer-readable storage medium may be a ROM, a RAM, a CD-ROM, a magnetic tape, a floppy disk, an optical data storage device, or the like.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

It may be noted that the foregoing embodiments are merely for the purpose of description instead of limiting the present application.

The technical characteristics of the above embodiments may be employed in arbitrary combinations. To provide a concise description of these embodiments, all possible combinations of all the technical characteristics of the embodiments may not be described; however, these combinations of the technical characteristics should be construed as falling within the scope defined by the specification as long as no contradiction occurs.

Only several implementations of the present application are described in detail in the above embodiments, but they should not therefore be construed as limiting the scope of the present application. It should be noted that those of ordinary skill in the art can further make variations and improvements without departing from the conception of the present application. These variations and improvements all fall within the protection scope of the present application. Therefore, the protection scope of the present application should be subject to the protection scope defined by the claims.

The invention claimed is:

1. A circuit simulation test method, comprising:
  creating a parametric data model, wherein the parametric data model is configured to generate preset write data based on a preset parameter;

creating a test platform, wherein the test platform is configured to generate a test result based on the preset write data;

creating an eye diagram generation module, wherein the eye diagram generation module is configured to generate a data eye diagram based on the test result; and conducting a simulation test, inputting the preset write data to the test platform and obtaining the test result, and generating the data eye diagram by using the eye diagram generation module; wherein the preset write data is a serial multi-bit data string; and
the preset parameter comprises a first value and a second value; and the preset write data is configured as follows: when previous-bit data is at a low level, a voltage of next-bit high-level data is lower than a preset high voltage by the first value; and when the previous-bit data is at a high level, a voltage of next-bit low-level data is higher than a preset low voltage by the second value.

2. The method according to claim 1, wherein the preset write data is further configured as follows: when the previous-bit data is at the low level, the voltage of the next-bit low-level data is equal to the preset low voltage; and when migrated-bit data is at a high level, the voltage of the next-bit high-level data is equal to the preset high voltage.

3. The method according to claim 2, wherein the preset parameter comprises a first rising delay, a second rising delay, and a third value; and the preset write data is further configured as follows: when the previous-bit data is at the low level, time required for increasing the voltage of the next-bit high-level data from a low level state to be lower than the preset high voltage by the third value is the first rising delay, and time required for increasing the voltage of the next-bit high-level data that is lower than the preset high voltage by the third value to be lower than the preset high voltage by the first value is the second rising delay, wherein the third value is greater than the first value.

4. The method according to claim 3, wherein the preset parameter further comprises a first falling delay, a second falling delay, and a fourth value; and the preset write data is further configured as follows: when the previous-bit data is at the high level, time required for reducing the voltage of the next-bit low-level data from a high level state to be higher than the preset low voltage by the fourth value is the first falling delay, and time required for reducing the voltage of the next-bit low-level data that is higher than the preset low voltage by the fourth value to be higher than the preset low voltage by the second value is the second falling delay, wherein the fourth value is greater than the second value.

5. The method according to claim 1, wherein the test platform comprises an electro-static discharge protection module, a transmitting module, and a receiving module, and the generating the data eye diagram by using the eye diagram generation module comprises: generating a first data eye diagram by using the eye diagram generation module.

6. The method according to claim 5, wherein the receiving module further comprises an equalization module, and the generating the data eye diagram by using the eye diagram generation module comprises: generating a second data eye diagram by using the eye diagram generation module.

7. The method according to claim 6, wherein a composite eye diagram is generated based on the first data eye diagram and the second data eye diagram.

8. A non-transitory computer-readable storage medium, wherein the non-transitory computer-readable storage medium stores a computer program, and the computer program is executed by a processor to implement the steps of the method according to claim 1.

9. A circuit simulation test method, comprising:
creating a parametric data model, wherein the parametric data model is configured to generate preset write data based on a preset parameter;

creating a test platform, wherein the test platform is configured to generate a test result based on the preset write data;

creating an eye diagram generation module, wherein the eye diagram generation module is configured to generate a data eye diagram based on the test result; and conducting a simulation test, inputting the preset write data to the test platform and obtaining the test result, and generating the data eye diagram by using the eye diagram generation module; wherein the preset write data is a serial multi-bit data string; and
the generating a test result based on the preset write data comprises:
receiving, by the test platform, the preset write data, and obtaining a reception result; and
comparing the preset write data and the reception result bit by bit, wherein when the preset write data and the reception result are the same, the test result is test passed; otherwise, the test result is test failed.

10. The method according to claim 9, wherein the obtaining a reception result comprises: receiving the preset write data in response to a data strobe clock signal, comparing a voltage of the preset write data and a reference voltage, and obtaining the reception result.

11. The method according to claim 10, wherein the inputting the preset write data to the test platform and obtaining the test result further comprises:
scanning the reference voltage range to obtain each reference voltage;
scanning a sampling point at which the preset write data is sampled by the data strobe clock signal; and
inputting the preset write data to the test platform, and obtaining a test result under each reference voltage and each sampling point.

12. The method according to claim 11, wherein the generating the data eye diagram by using the eye diagram generation module comprises:
taking each strobed data time as a first coordinate value and each reference voltage as a second coordinate value, and generating, based on each strobed data time and the test result under each reference voltage, a two-dimensional data eye diagram displaying the test result.

13. The method according to claim 12, wherein the scanning a sampling point for sampling the preset write data by the data strobe clock signal comprises:
scanning a strobed data time range based on a first step to obtain each the strobed data time.

14. The method according to claim 13, wherein the first step comprises a first substep and a second substep; and
the scanning a strobed data time range based on a first step to obtain each strobed data time comprises:
determining an edge strobed data time range on at least one side of the strobed data time range;
setting the first substep of the edge strobed data time range;
obtaining an intermediate strobed data time range, excluding the edge strobed data time range, in the strobed data time range;

obtaining the second substep of the intermediate strobed data time range; and scanning the edge strobed data time range based on the first substep, and scanning the intermediate strobed data time range based on the second substep, to obtain each strobed data time, wherein the first substep is larger than the second substep.

15. The method according to claim 14, wherein the scanning a reference voltage range to obtain each reference voltage comprises:

scanning the reference voltage range based on a second step to obtain each reference voltage.

16. The method according to claim 15, wherein the second step comprises a third substep and a fourth substep; and the scanning the reference voltage range based on a second step to obtain each reference voltage comprises:
determining an edge reference voltage range on at least one side of the reference voltage range;
obtaining the third substep of the edge reference voltage range;
determining an intermediate reference voltage range, excluding the edge reference voltage range, in the reference voltage range;
obtaining the fourth substep of the intermediate reference voltage range; and
scanning the edge reference voltage range based on the third substep, and scanning the intermediate reference voltage range based on the fourth substep, to obtain each reference voltage, wherein the third substep is greater than the fourth substep.

17. A circuit simulation test apparatus, comprising:

one or more processors; and a storage apparatus, configured to store one or more programs, wherein the one or more programs, when executed by the one or more processors, cause the one or more processors to execute operations of:

generating preset write data based on a preset parameter;

generating a test result based on the preset write data; and generating a data eye diagram based on the test result; wherein
the preset write data is a serial multi-bit data string; and
the preset parameter comprises a first value and a second value; and the preset write data is configured as follows: when previous-bit data is at a low level, a voltage of next-bit high-level data is lower than a preset high voltage by the first value; and when the previous-bit data is at a high level, a voltage of next-bit low-level data is higher than a preset low voltage by the second value.

* * * * *